Dec. 6, 1949     J. R. LOWRY     2,490,366
CLAW ASSEMBLY FOR MILKING MACHINES
Filed July 30, 1947
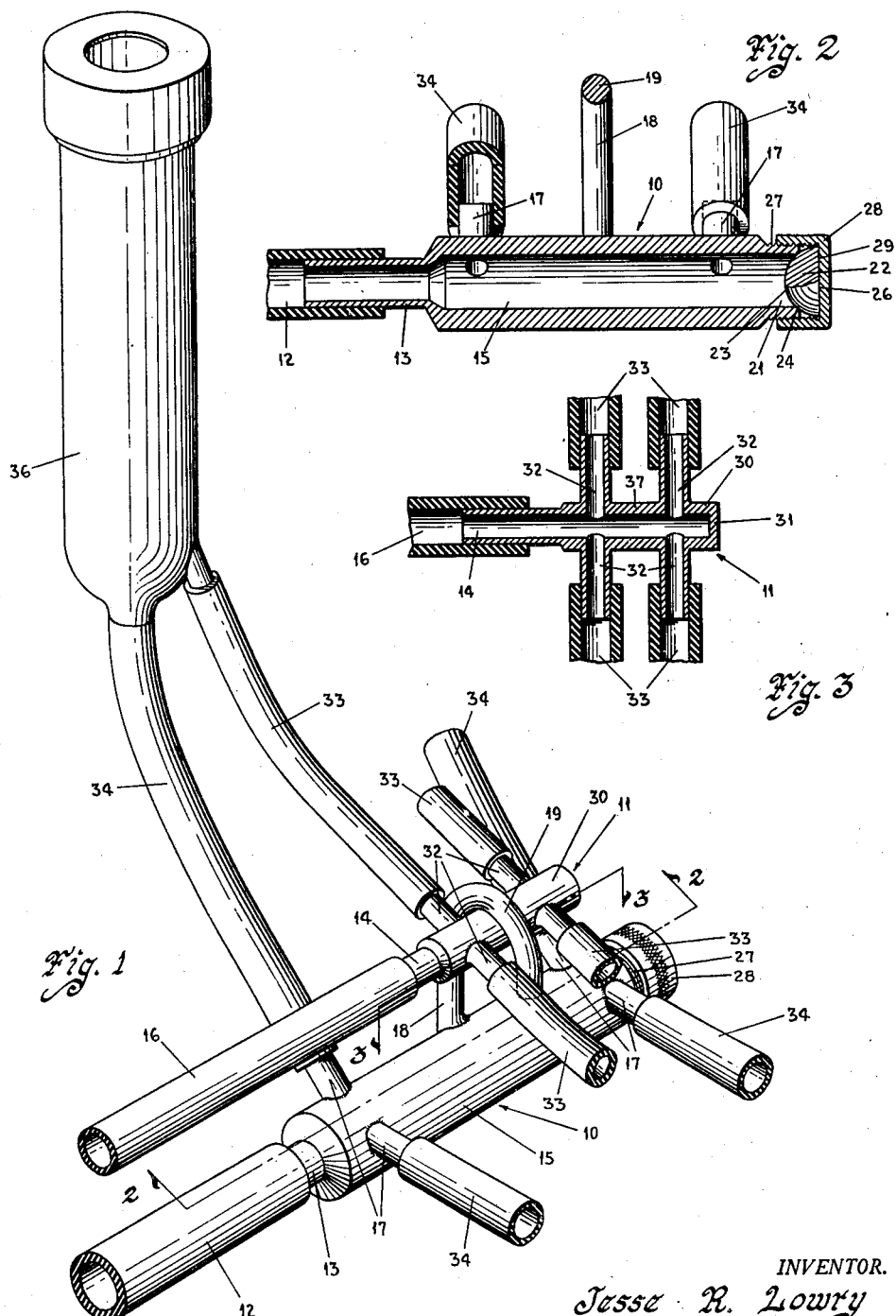
INVENTOR.
Jesse R. Lowry
BY
Rudolph L. Lowell
Attorney Patented Dec. 6, 1949

2,490,366

UNITED STATES PATENT OFFICE 2,490,366

CLAW ASSEMBLY FOR MILKING MACHINES

Jesse R. Lowry, Des Moines, Iowa

Application July 30, 1947, Serial No. 764,869

1 Claim. (Cl. 31—83)

This invention relates generally to milking machines and in particular to a claw assembly for a milking machine of the pulsator type.

An object of this invention is to provide an improved claw assembly for a milking machine.

A further object of this invention is to provide a milker claw assembly of a construction such that all of the milk-carrying passages therein are readily accessible for cleaning purposes.

Still another object of this invention is to provide a milker claw assembly, which is of a simple construction, and comprised of separate air and milk-carrying members formed with coacting portions adapted to releasably hold such members in assembly relation.

A feature of this invention is found in the provision of a milker claw assembly in which a tubular milk-carrying member, fluid sealed at one end, is provided with oppositely arranged upwardly and outwardly projected milk tubes. An upright hook member, secured to one side of the milk member and between the milk tubes thereon, has its hook portion extended transversely across and above the milk member. A tubular air-carrying member, closed at one end, is formed with air tubes extended laterally in opposite directions therefrom. That portion of the air member, between the tubes, is loosely receivable within the hook on the milk member to maintain the air member in assembly relation with the milk member.

Further objects, features and advantages of this invention will become apparent from the following description when taken in connection with the accompanying drawings, in which:

Fig. 1 is a perspective view of the milker claw assembly of this invention, shown in assembly relation with a teat cup therefor;

Fig. 2 is a longitudinal sectional view of the milk-carrying unit as seen on the line 2—2 in Fig. 1; and Fig. 3 is a longitudinal section view of the air-carrying unit taken along the line 3—3 in Fig. 1.

With reference to the drawings, the milker claw assembly of this invention is illustrated in Fig. 1 as including a milk-carrying unit 10 having a tubular body member 15 and an air-carrying unit 11 having a tubular body member 30 of a shorter length than the body member 15. The assembly is adapted for use with a milker machine of the pulsator type. A milk conduit 12, attached to the end 13 of the body member 15, is connectible with a milk receptacle (not shown) which receptacle is maintained under a sub-atmospheric pressure in the operation of the machine. The end 14 of the body member 30 has an air conduit 16 attachable with a pulsator apparatus (not shown) of the milking machine, which apparatus functions in a well known manner to deliver air at alternately high and low pressures to the conduit 16.

The end 13 of the body member 15 (Figs. 1 and 2) is of a reduced diameter for insertion within the milk conduit 12. Milk tubes 17, integrally formed with the body member 15, are arranged in a longitudinally spaced relation and in pairs, with the milk tubes in each pair of tubes being arranged oppositely from each other and extended upwardly and outwardly from the body member 15. The inner ends of the milk tubes 17 are in fluid communication with the space within the body member 15.

Arranged between the pairs of milk tubes 17, as illustrated in Figs. 1 and 2, is an upright hook member 18 having its lower end secured as by welding, to one side of the body member 15. The hook portion 19, of the hook 18, is extended transversely across the top side of the body member 15 at a position spaced upwardly from the top side of the body member.

The end 21, of the body member 15, is fluid sealed by the provision of removable means including a sealing member 22 of a semi-spherical shape. The rounded or convex end 23 of the sealing member 22 is received in seated engagement on a seat portion 24 formed in the end 21, such that the flat side 26 of the sealing member is positioned outwardly from the body member end 21. The sealing member is of a size adapted to fit within the transverse dimensions of the body member end 21.

The body member end 21 is externally threaded, as indicated at 27, for threadable connection with an internally threaded cap member 28. On tightening of the cap member 28, the inner side of the base 29 thereof engages the flat side 26 of the sealing member 22 to maintain the seated engagement of its rounded end 23 within the seat 24. It is seen, therefore, that the fluid sealing of the end 21 of the body member 15 is not dependent upon a close fit between the threads 27 and the cap member 28. On removal of the cap member 28, the sealing member 22 is also removable so that complete accessibility is given to the body member 15 and milk tubes 17 for cleaning purposes.

The body member 30, of the air-carrying unit 11, (Figs. 1 and 3), has its end 31 closed and its end 14 of a reduced section for insertion within the air conduit 16. The body member 30 is integrally formed with oppositely arranged pairs of air tubes 32, which are arranged in a common plane and extended laterally in opposite directions from the body member 30.

In use, air lines 33 and milk lines 34, forming part of inflation type teat cups 36 (one of which is illustrated in Fig. 1) are connected, respectively, with the air tubes 32 and the milk tubes 17. That portion 37 of the air body member 30, disposed between the air tubes 32, is received within the hook section 19. When the teat cups 36 are in position on a cow, the resilient action of the air lines 32 and the milk lines 34 tends to hold the air unit 11 within the hook section 19, while the air tubes 32, arranged at opposite sides of the body member portion 37, are engageable with opposite sides of the hook section 19 to limit the longitudinal movement of the air unit 11 relative to the milk unit 10.

It is seen, therefore, that the air unit 11 is loosely maintained in assembly relation with the milk unit 10 at a position in longitudinal alignment with and above the milk unit 10. When the milking machine is not in operation, the hook 18 may be used to hang the claw assembly from any suitable support (not shown) provided on the machine.

From a consideration of the above description, it is seen that the invention provides an improved claw assembly for a milker machine in which the air and milk-carrying units are of separate constructions, and provided with coacting portions capable of maintaining the air and milk units in relative assembly positions, when the claw assembly is supported from a cow. Further, the milk unit is of a simple construction and provided at one end with a removable fluid sealing means, which on being removed provides complete access to all of the milk carrying passages for cleaning purposes.

Although the invention has been described with respect to a preferred embodiment thereof, it is not to be so limited since changes can be made therein which are within the full intended scope of this invention as defined by the appended claim.

I claim:

In combination, a claw assembly for a milker machine comprising a milk-carrying member of a tubular shape, removable means for fluid sealing one end of said milk member, with the other end of said milk member being connectible with a milk container, pairs of upwardly and outwardly projected milk tubes arranged in a spaced relation longitudinally of said milk member, an upright hook member secured to one side of said milk member at a position between said spaced milk tubes and having the hook portion thereof extended transversely across said milk member, an air-carrying member of a tubular shape closed at one end and connectible at its other end with a pulsator mechanism, and air tubes spaced longitudinally of said air member and extended in opposite directions radially from said air member, with said air member, between an adjacent pair of said air tubes, being receivable within said hook portion, with the longitudinal spacing between said milk tubes being such that in the hook connection of said milk member and said air member, said air tubes are positioned between said pairs of milk tubes.

JESSE R. LOWRY.

REFERENCES CITED

The following references are of record in the file of this patent:

UNITED STATES PATENTS

| Number | Name | Date |
|---|---|---|
| 1,137,466 | Dillon | Apr. 27, 1915 |
| 1,263,347 | Eklundh | Apr. 16, 1918 |
| 1,285,338 | Oden et al. | Nov. 19, 1918 |
| 1,385,577 | Oden | July 26, 1921 |
| 1,417,801 | Cook | May 30, 1922 |
| 1,440,912 | Davies | Jan. 2, 1923 |
| 2,287,750 | Clayton | June 23, 1942 |

FOREIGN PATENTS

| Number | Country | Date |
|---|---|---|
| 109,924 | Australia | Feb. 26, 1940 |